(12) United States Patent
Thorsson et al.

(10) Patent No.: US 8,348,144 B2
(45) Date of Patent: Jan. 8, 2013

(54) TRACING ITEMS THROUGH A NON-SEQUENTIAL PROCESS

(75) Inventors: Brynjolfur Thorsson, Reykjavik (IS); Bjorn Thorvaldsson, Gardabaer (IS); Asgeir Asgeirsson, Reykjavik (IS)

(73) Assignee: Marel Food System HF, Gardabaer (IS)

( * ) Notice: Subject to any disclaimer, the term of this patent is extended or adjusted under 35 U.S.C. 154(b) by 273 days.

(21) Appl. No.: 12/086,757

(22) PCT Filed: Dec. 19, 2006

(86) PCT No.: PCT/IS2006/000023
§ 371 (c)(1), (2), (4) Date: Jul. 20, 2010

(87) PCT Pub. No.: WO2007/072508
PCT Pub. Date: Jun. 28, 2007

(65) Prior Publication Data
US 2010/0282833 A1    Nov. 11, 2010

(30) Foreign Application Priority Data

Dec. 22, 2005   (IS) ................................. 8196

(51) Int. Cl.
*G06F 17/00* (2006.01)
*A22B 5/00* (2006.01)
(52) U.S. Cl. ..................... 235/375; 452/198
(58) Field of Classification Search .......... 235/375; 452/198
See application file for complete search history.

(56) References Cited

U.S. PATENT DOCUMENTS

| 5,478,990 A | 12/1995 | Montanari et al. |
| 6,545,604 B1 * | 4/2003 | Dando et al. ............. 340/572.1 |
| 6,877,460 B1 * | 4/2005 | Ellis ........................... 119/842 |
| 2002/0004366 A1 | 1/2002 | Thorvaldsson et al. |
| 2004/0082291 A1 | 4/2004 | Thorvaldsson et al. |

FOREIGN PATENT DOCUMENTS

| DE | 195 02 689 | 8/1996 |
| WO | 95/02331 | 1/1995 |

OTHER PUBLICATIONS

International Search Report for PCT/IS2006/000023, mailed Mar. 1, 2007.
Preliminary Report on Patentability for PCT/IS2006/000023 with amended sheets, dated May 23, 2008.

\* cited by examiner

*Primary Examiner* — Thien M Le
*Assistant Examiner* — Toan Ly
(74) *Attorney, Agent, or Firm* — Nixon & Vanderhye PC (57) ABSTRACT

A method and a system for tracing items through a non-synchronized process are disclosed. Information relating to items going through processing is obtained by a control mechanism, such as any processing device or an autonomous robot for transferring the item. The placement or position of the item after processing or transfer is stored as traceable information for the transferred items in a data base and the information relating to the item on arrival and the information after processing or transfer then contributes to historic information about the items.

22 Claims, 7 Drawing Sheets

TRACING ITEMS THROUGH A NON-SEQUENTIAL PROCESS

TECHNICAL FIELD

The present invention relates to a method and a system for handling information in relation to items, such as food items, being conveyed through non-synchronized, non-sequential, non-linear processing. The information is used to trace the processing history of food items, including its origination and packing. The ability to trace the processing history may be used e.g. in order to trace back sources of contamination and for verification of the status and quality, weight etc. of the food. The information is furthermore useful for the control and management of the food processing plant.

BACKGROUND ART

Tracing food items through processing for recordkeeping is known in the art. This is of great importance when food contamination is discovered somewhere in the supply chain. The ability to catalog food products through processing, such as mother origin of livestock, which slaughterhouse was used and the name of the worker can also help with maintaining good quality assurance and minimize the damage in case of any contamination. Moreover, after the slaughtering of the livestock each piece of the animal can further be tracked and catalogued to produce traceable information regarding the origin of the food item as well as the process it has gone through during the processing in the processing plant. The sequential nature of the food processing makes it easy to keep track of this information until the final product goes through a packing process.

WO0191565 discloses a process and an application for handling information in relation to meat being conveyed through a number of processing stations. The information is used to trace the processing history of a piece of meat, including its origination. The ability to trace the processing history may be used e.g. in order to trace back sources of contamination and for verification of the status and quality, weight etc. of the meat. The information is furthermore useful for the workers processing the meat at the stations or useful for the control and management of the meat processing plant.

WO03077662 discloses a method and system for monitoring the processing of items such as pieces of meat, including carcasses of pigs, calves, beeves and so on, also poultry, fish etc., where use is made of identification for the individual animal and/or the individual item or part item. The processing involves cutting-up into smaller pieces, inasmuch as a registration of identification for a piece of meat, a carcass or the like is affected. The piece of meat is allocated to one of a multiple of workstations, inasmuch as identification for the said workstation is registered and the allocated piece of meat is processed at the workstation while use is made of visual instruction. Hereafter, a further transport is established of the whole or parts of the yield from the cutting-up of the allocated piece of meat, such as one or more cuts. The further transport is similarly registered so that traceability is established for the pieces of meat, including also for the cuts.

Most food processing methods include shuffling of items during the processing, which may sometimes be from multiple processing lines. Therefore, the traceable information is often lost during packing, the final stage of the processing as well known and traceable items at the in-feed to a selection or packing process are mingled together with other pieces. The finished and packed product may be traced from the warehouse or distributor to the retailers. This normally results in food being recalled in a large quantity when food contamination is discovered due to lack of traceability of the items.

Prior art methods and systems for tracing food items through processing plants take advantage of the sequential nature of food processing. However, when it comes to tasks in the processing which are not sequential in nature: For example distributing items to a de-boning station based on real-time information such as availability of de-boners, demand, quality of work etc. Or simply the fact that we want to select four slices of meat from four different cutters to make a packing of four slices which are exactly the same size, shape and color. When it comes to these non-sequential processing decisions the sequential advantage is lost. Unfortunately, prior art systems do not adequately address this challenge, when it comes to non-sequential processing tracing information are lost.

SUMMARY OF INVENTION

In processing of items, such as food items, there are certain points (18) in the process were a decision needs to be made which may cause shuffling of items to reach some desirable outcome. In the prior art these decisions are ignored in the favor of being able to trace individual items during a sequential processing scheme. There are however, several points (18) in the process were non-sequential processing of items would be preferable over sequential processing. Using for example autonomous robots instead of conveyor system can overcome bottlenecks in processing lines by redistributing tasks depending on real-time information rather than sequentially deliver products to workers. Some product "A" might for example result in higher yield using beef from farm "X" rather than from farm "Y". This could for example be because the beef from farm "X" are of different breed than the beef from farm "Y". A better yield could also result in providing the best cutters with the best meat, while an average cutter simply gets an average meat, and the least qualified cutters get the lowest quality meat. The problem with these ideal but non-sequential processing situations is tracing of the meat. Once the sequential processing pattern is broken up, tracing of the items gets difficult to keep track off and prior art solutions are inept.

The present invention relates to method and a system for tracing items through a non-sequential process (18). Items arrive at in-feed locations from to a process line or packing station, where the position of each item on the in-feed line is known. The information relating to the items arriving on in-feed line is obtained by a control mechanism, which is either a processing device for processing the item or an autonomous robot for transferring the item. The robot selects items from the in-feed line based on the information and on criteria for further processing and places the items one by one to at least one non-synchronized processing or out-feed line. The placement or position of the item after processing or transfer is stored as traceable information for the transferred items in a data base and the information relating to the item on arrival and the information after processing or transfer then contributes to a historic information of said items. The present invention therefore provides a method and a system for tracing an item from the raw material or ingredients, which make up the item or product, and to the end of the processing and packing of the item. After packing the items, the item is labeled with traceable information relating all the items which are packed together. This allows for quick tracking of products such as contaminated food items from the same origin, when a consumer gets a food poisoning or drugs, if a prescription drug causes undesirable effects.

According to the present invention, a method and a system is provided, which enable for handling instructions in relation to items, such as food items, being conveyed through non-synchronized, non-sequential, non-linear processing, and further to provide a record of the item through the non-sequential processing as traceable information in a data base. For each processing step the position of the item in the processing, both the placement of the item on a conveyor is known for the item as it arrives as well as when it leaves the processing station and this data contributes to historic information of said items.

In the present invention dynamic decisions are made for items regarding how they should be handled (processed) and were they should be processed. These decisions are made based on at least one of the following: desired output, characteristics of the present item, and the state of the processing plant. Decisions based on the desired output could for example be the quantity of the desired end product, for example ground beef and steaks. Decisions based on the characteristics of the present item could for example be origin, color of the meat, weight, fat content and so on. Decisions based on the state of the processing plant could for example be based on how much of different parts are left processing and how they could be best utilized to obtain the desired output. Current or foreseeable bottlenecks downstream the processing line. Idle workers downstream the processing line and so on. Moreover, these dynamic decisions need not to be based on simply one of the above but could also be based on several of the described parameters and the parameters could also have different weight in the dynamic decision.

In a first aspect of the present invention, a method for tracing items through a non-sequential process is provided. The method comprising the steps of receiving the items from at least one in-feed line and obtaining a first information relating to the items arriving on the at least one in-feed line. The items are then transferred one by one to at least one non-sequential out-feed line and traceable second information is stored for the transferred items. The items are transferred based on dynamic decisions and wherein the first information and the second traceable information contribute to historic information of said items. For a multi-step process, where the items are transferred from one conveyor to another, the steps above are repeated through the series of non-sequential processes and the first information and the second traceable information from each process generate the historic information of said items. After transfer of each item from one line to another the information is stored in a data base.

The information may be stored such that the first information and the second information is stored together as third information, and this third information is then obtained by a robot in the next processing step as the first information. In this case the tracking is performed in a single step for the whole processing of the item as the placement information after each new placement is supplemented with all prior placement information for that particular item.

Another possibility is that only the ID of the item is stored together with new placement information as a third information in a separate database and that third information is then obtained by a robot in the next processing step as the first information. In this case the tracking is performed step by step through the whole processing of the item.

In an embodiment of the present invention the transfer means for transferring food items one-by-one from the in-feed line to the out-feed line is an autonomous robot. In the present context the word robot is in accordance with the ISO 8373 word definition. "An automatically controlled, reprogrammable, multipurpose, manipulator programmable in three or more axes, which may be either, fixed in place or mobile for use in industrial automation applications."

The first information for each food item can be obtained with image indication such as a machine vision system of a robot using the machine vision the robot (1) locates an item (5) traveling oh the conveyor (4). The camera of the machine vision system in one embodiment is located at the robot (1), while in another embodiment the camera is located at a fixed position and the robot (1) moves in a fixed coordinate system. The machine vision system for locating items on the conveyor is not limited to a two dimensional vision system and a three dimensional vision system is preferred in embodiments where items are selected based on size rather than shape. In one embodiment a machine vision system obtains an image when an item is placed at an in-feed location and stores the image in a database. Later when a robot selects this item the robot obtains an image of the same item and compares it to the image (first information) from the database. When the robot drops of the item at an out-feed location, which in fact is then an in-feed location of another process, the robot obtains a second image of the item and stores it in a database. In this way, images are stored at every transition point and, therefore, the orientation and rotation of the item will not become a difficult image processing task. However, the image processing complexity is not a limiting factor of the invention. Powerful image processing unit could be provided in cases were rotation and orientation of the object are difficult to control.

Moreover, the machine vision system is not limited to operate in the visual spectrum of light. Myriad of methods can be used for creating an image including but not limiting to the use of infra red spectrum, ultra violet spectrum, radio frequency, or even ultra sound waves.

The first information for each food item can be obtained from a data storage means such as a data base. The information may me data relating to the type, size or weight of the item, or from which half of the animal a certain piece originates such as right or left wing of a chicken.

The robot may operate under control of predetermined rules for transferring items from one line to another, or the robot may itself determine the best placement for an item. Therefore the robot may be directly supplied with placement information leaving four possible scenarios, (i) where the robot determines which items are selected and (ii) where the items are placed or the robot is instructed which items are to be selected and where the items should be placed. Furthermore, (iii) the robot can determine which items are selected, but robot is instructed where the items should be placed or (iv) the robot is instructed which items are to be selected, but the robot determines where the items should be placed.

In an embodiment of the present invention, the items are processed before they are transferred to the out-feed line, where the processing means is directly supplied with placement information. The processing means may comprise separating means for portioning the food items, such as knife blades etc, but also weighing means, pressing means, washing means etc. The processing means may comprise means for delivering items in a liquid form onto the conveyor belt, such as when portions of food are being transferred onto a plate or a tray. Then a portion of meet and potatoes are transferred to the plate and a pumping device will pump a predetermined amount of sauce onto the plate.

In an embodiment of the present invention, the out-feed line leads to a packing station, but the out-feed line may also be a packing station. The items may be labeled after packing, where a reference to the historic information from the storage means is stored together with the label-ID for the item.

In an embodiment of the present invention, the product is a consumable selected from food items, drugs, including prescription drugs, sanitation or cleaning products, cloths, toys etc, and the label is selected from the group comprising, but not limited to bar code, RFID, sequence number etc.

In an embodiment of the present invention, the first information is selected from the following, but not limited to origin of the item, type or subtype of item, weight and the position on the in-feed conveying means and the second information is selected from the following, but hot limited to origin of the item, type or subtype of item, weight and the position on the out-put conveying means.

The present invention further relates to a computer program product directly loadable into the internal memory of a digital computer to operate the system and the method of the present invention. The computer program comprises program instruction means, for instructing a computer processor to:

retrieve data regarding items arriving on at least one in-feed line from a data storage means, communicate information regarding placement of said items at least one in-feed line to the control device, communicate information regarding a transferring of said items, register transfer data in said data storage means, control interaction between an operator and said computer program product via a human machine interface.

The computer program product governs the transfer by controlling through the means of hardware/software interface which items are picked from the in-feed line and where the same items are placed on the out-feed line.

In an embodiment of the present invention, an additional program instruction means, recorded on said medium, for instructing a computer processor is present to control a processing step of said food items.

The human machine interface of the present invention may be selected from the group of, but not limited to a graphical user interface (GUI) or a command line interface.

The data storage means of the present invention may reside on the same computer as said computing program product or the data storage means, and said computing program product resides on different computers. Furthermore, the data storage means may be a distributed database residing on multiple interconnected computers, where the multiple interconnected computers reside at different locations.

In a third aspect of the present invention a system is provided for tracing items through a non-sequential process where the system comprises at least one in-feed conveying means, for transporting the items from an in-feed line to a process line and a human machine interface. At least one out-put conveying means is provided as well as at least one processing means and a control means, where the control means interacts with the transfer means to perform a non-sequential transport of the items from the at least one in-feed conveying means to the at least one out-put conveying means. The system further comprises a data storage means for storing the first information relating to the items on the in-feed conveying means and the second information relating to the items after transfer. A computing means is also a part of the system for processing the information and the storage means stores first information relating to the items on the in-feed conveying means and the second information relating to the items after transfer as historic information of said items.

In the present context, the term "human machine interface (HMI)" refers to means for an operator to communicate with the computing means. The implementation of the HMI is to is to be interpreted in the broadest meaning of the term ranging from a command line interface to sophisticated touch-screen graphical user interface.

In the present context, the term "data storage means" refers to means for storing data such as a data base or digital memory devices such as hard drives.

In the present context, the term "computing means" refers to Commercially Of The Shelf (COTS) computers as well as special computing systems designed and manufactured specifically for the present invention.

In the present context, the term "control means" refers to any actuators used for the implementation of the present invention including electrical, hydraulic, pneumatic, or any hybrid thereof.

The system of the present invention may additionally comprise a label generating means, for generating a label referencing a record in said data storage means. A label attaching device may also be provided for attaching said generated label to the finished and packed product, where the label generating device and the label attaching device can be two separate devices or one and the same device. The term "label" refers to any tag or label attached to a product or an item such as a bar code, radio frequency (RF) tag, serial number, etc. The term "labeling means" refers to any device or apparatus for labeling items or products such as bar-code labeling device, serial number labeling device (printer), and RF labeling device.

The implementations of the invention being described in the text above can obviously be varied in many ways. Such variations are not to be regarded as a departure from the spirit and scope of the present invention, and all such modifications as would be obvious to one skilled in the art are intended to be included within the scope of the following claims.

All embodiments of the present invention relate to the system and the method of the present invention.

BRIEF DESCRIPTION OF DRAWINGS

The present invention is described in detail below with reference to the following drawing figures of which.

DETAILED DESCRIPTION OF THE SPECIFIC EMBODIMENTS

The implementations of the invention being described in the following text can obviously be varied in many ways. Such variations are not to be regarded as a departure from the spirit and scope of the present invention, and all such modifications as would be obvious to one skilled in the art are intended to be included within the scope of the following claims.

Figure 1:
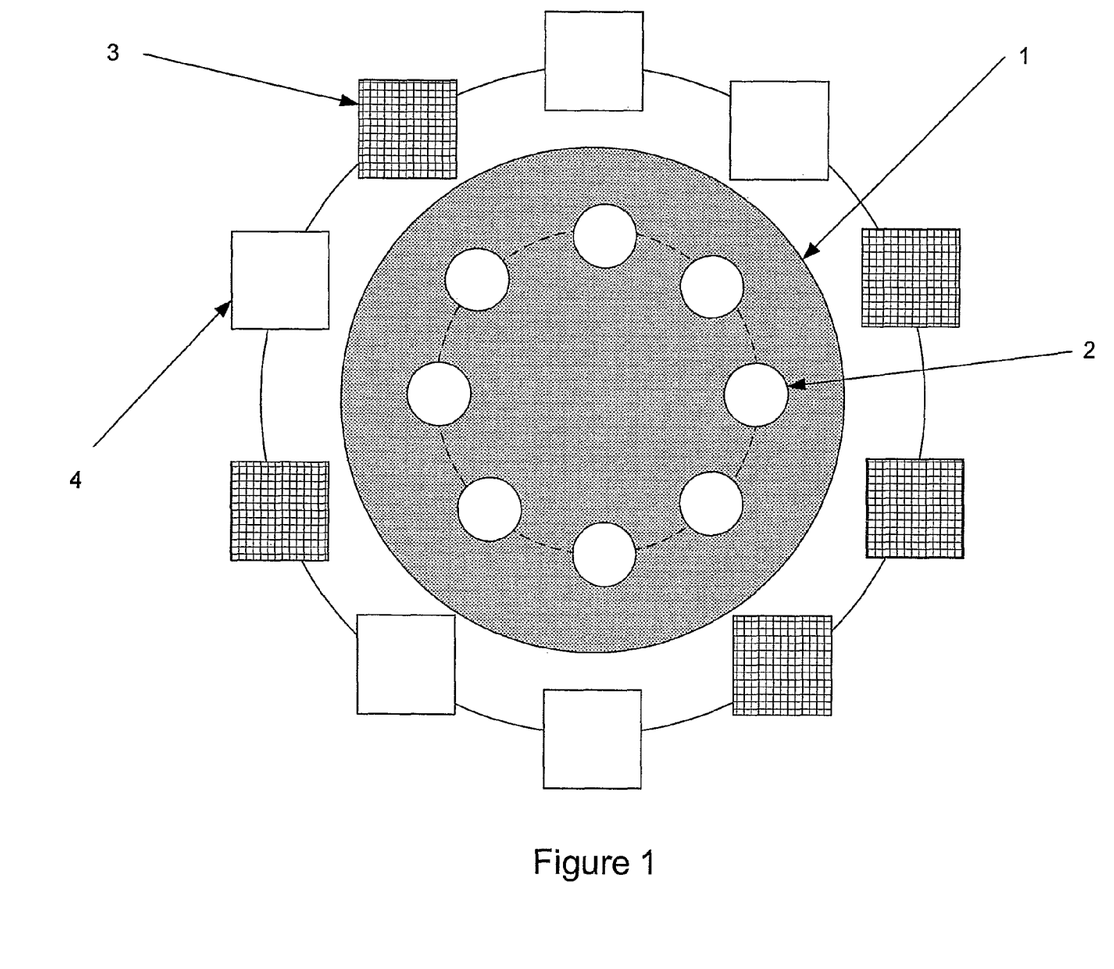
FIG. 1-3 The figures illustrate different processing ways to which the method and system of the present invention can be adapted.
Figure 2:
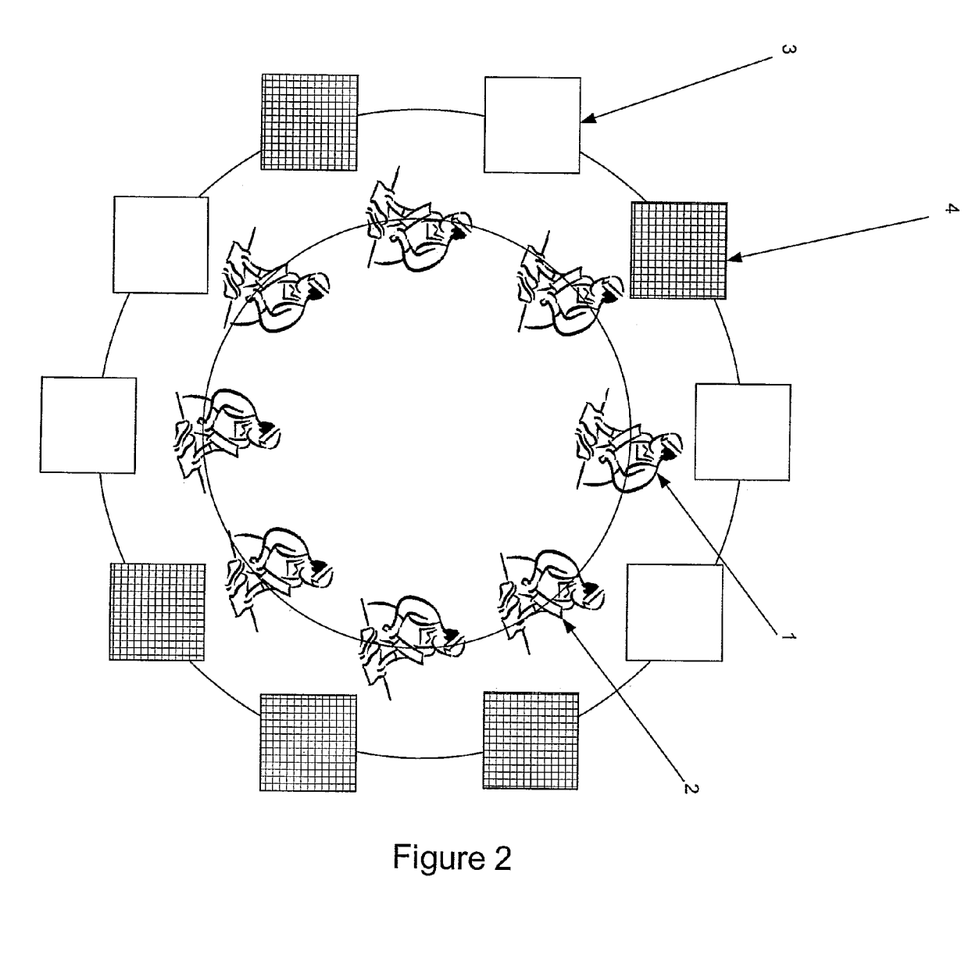
Figure 3:
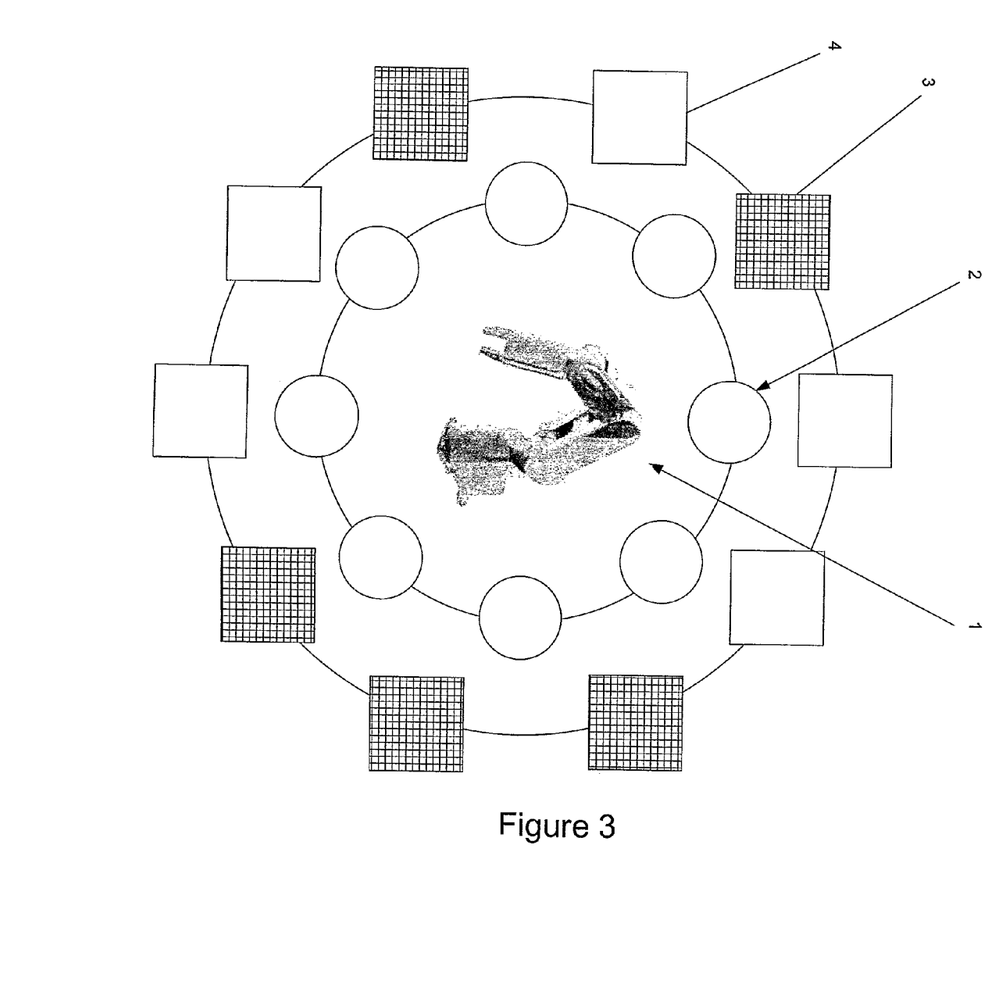

FIGS. 1-3 show various processing systems, to which the present invention can be adapted to. FIG. 1 shows an embodiment, where the handling means (1) is mechanical/electrical device. In this configuration the control device can directly control the device according to the instructions provided by the computer program product running on the computer via hardware/software interface. The handling means in this embodiment selects items from the in-feed locations (3), processes them according to some predetermined scheme in the one or more processing means (2). Finally, after processing the items the handling means places them in one of the drop-off locations (4).

In one embodiment, the handling means (1) is an operator as shown in FIG. 2. In this embodiment the control means can automatically monitor the in-feed locations (3) using dynamic scales and/or machine vision to instruct the operators to process (2) the food item according to some predetermined processing scheme. The control means could moreover, instruct the operator (1) were to place the processed item, or automatically monitor were the operator places the processed item using dynamic scales and/or machine vision. The operator could be instructed by using visual indication, according to the instructions provided by the computer program product running on the computer via hardware/software interface, by turning lights on or off representing in what drop-off location (4) the food item should be placed. Similarly, a laser beam can be used to point to the location, or a monitor showing the drop-off locations and highlighting the location which should receive the food item. The indication could also be audible signal such as instruction to the operator communicated wirelessly to his headphones.

In the third embodiment shown in FIG. 3, the handling means is an autonomous robot (1). In this embodiment the robot (1) could either receive direct information regarding at what in-feed location (3) to pick up items, and at what drop-off location (4) each handled food item should be placed from a control device. Similarly, the robot could retrieve by itself information about the food items arriving at the in-feed locations (3) from the database, and communicate the handling information of each item to the computer.

Figure 4:
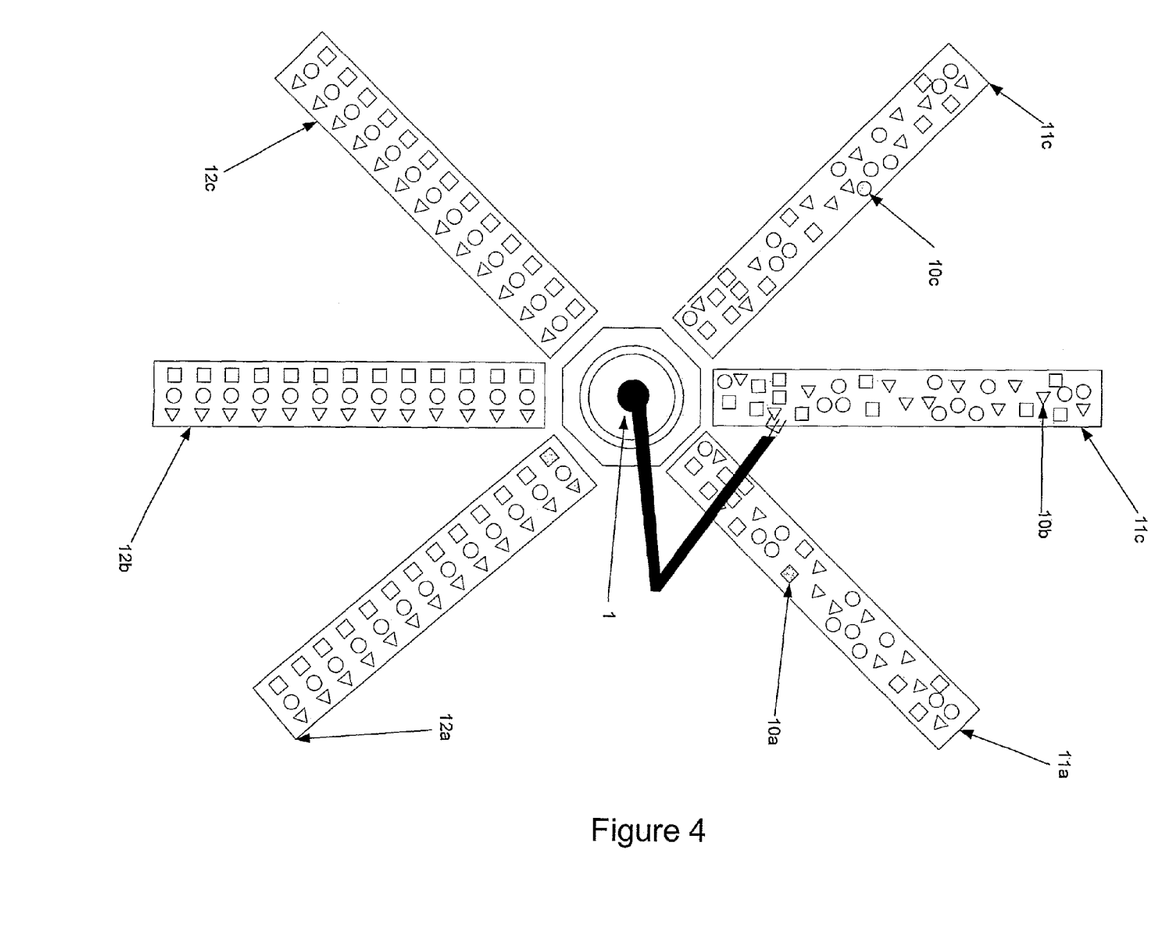
FIG. 4. The figure shows an embodiment, where a robot picks items from a processing line and places them on to an out-feed conveyor according to predefined rules.

In the embodiment shown in FIG. 4, a robot (1) is picking up items (10*a-c*) from 3 different in-feed conveyors (11*a-c*) and placing them on out-feed conveyors (12*a-c*) in an organized way according to pre-defined rules. The rules may be certain amount of three different items for each batch. Each item on the in-feed conveyor is known with respect to origin (such as farm, slaughter house etc) as well as type, weight, ID of processor. The robot decides, either according to pre-determined rules or due to its autonomous properties, the destination of each item and the destination is logged/stored in a data base. The origin of each item in a batch is therefore known with respect to origin etc. In this embodiment the robot (1) is picking items, such as chicken parts, for packing. The chicken parts are transferred towards the robot on the in-feed conveyors (11*a-c*) from a processing station, which portions the chicken into legs, wings and breasts. The chicken parts enter from three different processing stations on separate conveyors (11*a-c*). The position, type and weight of the chicken part are known for each chicken part on each one of the three conveyors as well as from which processing station and the ID of the worker portioning the chickens. This data is stored in a data storage means such as a computer or a separate database. The information is communicated to the control means which operates the robot. The robot is further controlled via a computer program, which defines the desired content of a portion or a package of chicken parts. The control means has information on all arriving chicken parts and gives command to the robots, which parts to collect and onto which out-feed conveyor (12*a-c*) to put them. This collection or transfer of chicken parts is non-sequential, so that the robot does not have to pick up the first chicken part to arrive and it can place it anywhere on the out-feed conveyor (12*a-c*). Information relating to the placement of a chicken part that has been transferred is stored in a data storage means, where the information comprises the first information as well as information on the location on the out-feed conveyor (12*a-c*). If the chicken part becomes a part of a portion, that data is stored as well. In this way the robot can pick parts of a certain type, size, weight or all three, so that a portion can contain chicken wings from the same side of the animal, within a certain weight ratio and when the portion has been packed, historical information relating to all the parts in the portion will be stored in a data storage means. If one animal is contaminated, portions with parts from that animal can be traced and taken out of circulation immediately.

In another embodiment of the present invention, legs of lamb are being sliced at a processing station. The slices are placed on an in-feed conveyor and the position of each slide is known and this information is stored together with information relating to the animal, farm and slaughter house used to slaughter the animal as well as information from which processing station the slice comes from and the ID of the worker portioning the lamb. The robot may have instruction to pick five slices into a portion and that each portion should have the second, third or the fourth slice from the leg and that the slices should be within a certain weight range.

Figure 5:
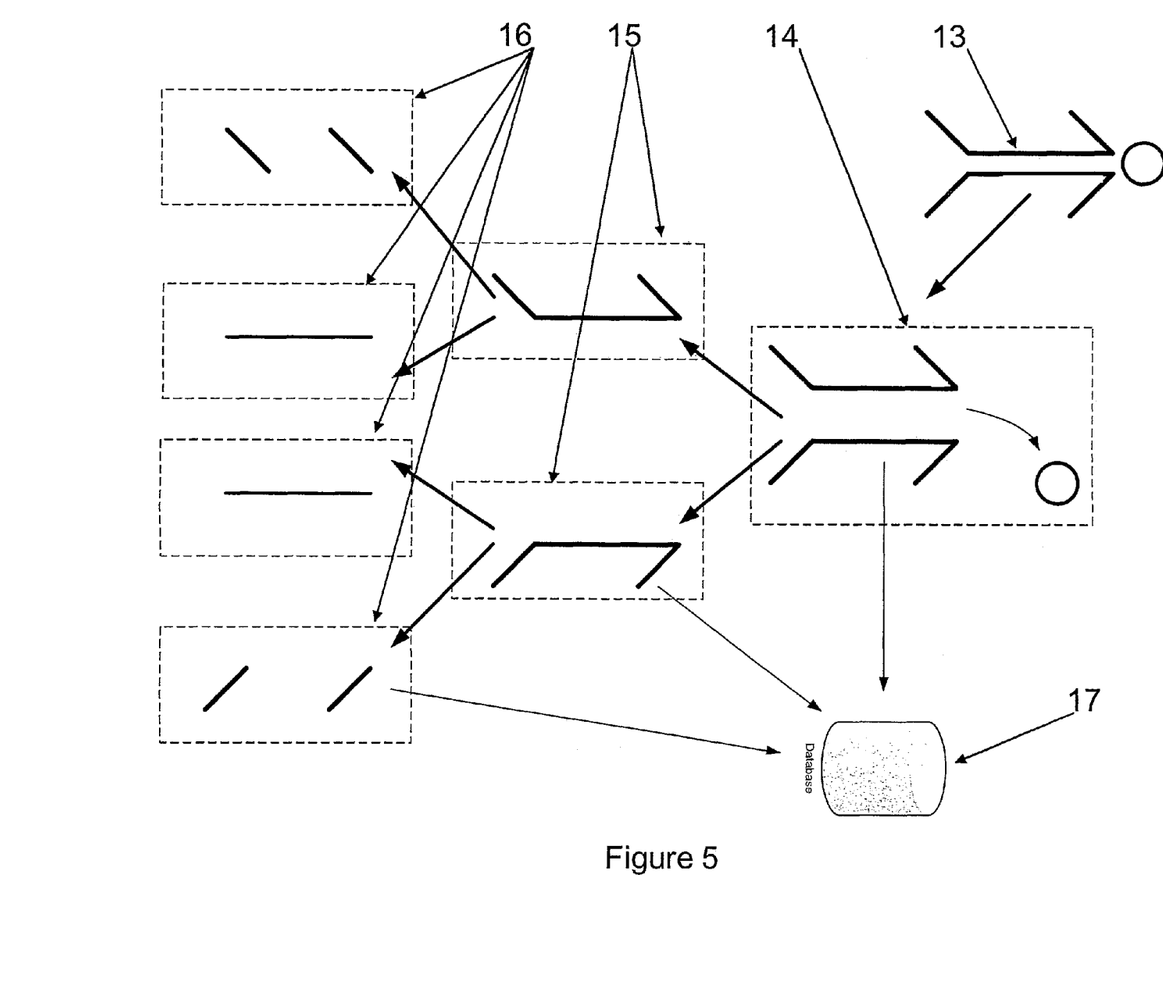
FIG. 5. The figure outlines a system, where an animal is portioned and the processing of each part of the animal and it's destination is logged/stored in a database.

In the embodiment shown in FIG. 5, a butchered animal (13) enters a processing line. Information regarding an ID of this specific animal is registered in a data base (17). The animal (13) is transferred to a first processing station (14), where the head is removed and the rest of the body is split into two identical parts along the backbone of the animal. Each half of the body enters different processing stations (15), and the information relating to which part is transferred to which processing station is registered in the database (17). In this processing station (15) the legs are removed on each line and the legs from each line are transported to new separate processing stations (16), where the information relating to which part is transferred, which processing line is registered in the database (17). The rest of the body enters a different processing line (16) for further processing and this transfer is also registered in the database (17). The processing may go on for various different processes, such as slicing legs, and isolating steaks from the body, where each processing step is registered in the database and as each part is transported from one process station to another, the in-feed location and the out-feed location for each specific part and the derivatives of each processed part are registered in a database. Each new piece of information may be registered in the same database (as shown in this embodiment), or in a different database for each step of the processing.

Figure 6:
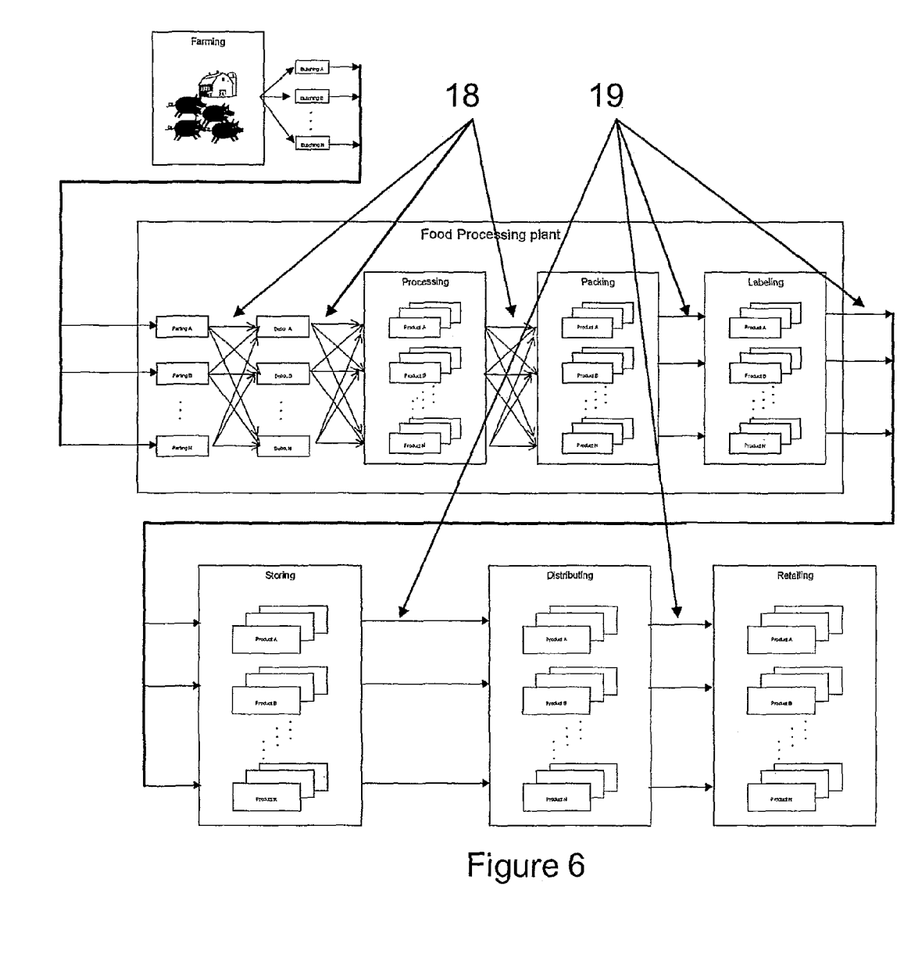
FIG. 6. The figure shows one possible processing arrangement, highlighting processing points were shuffling might take place.
Figure 7:
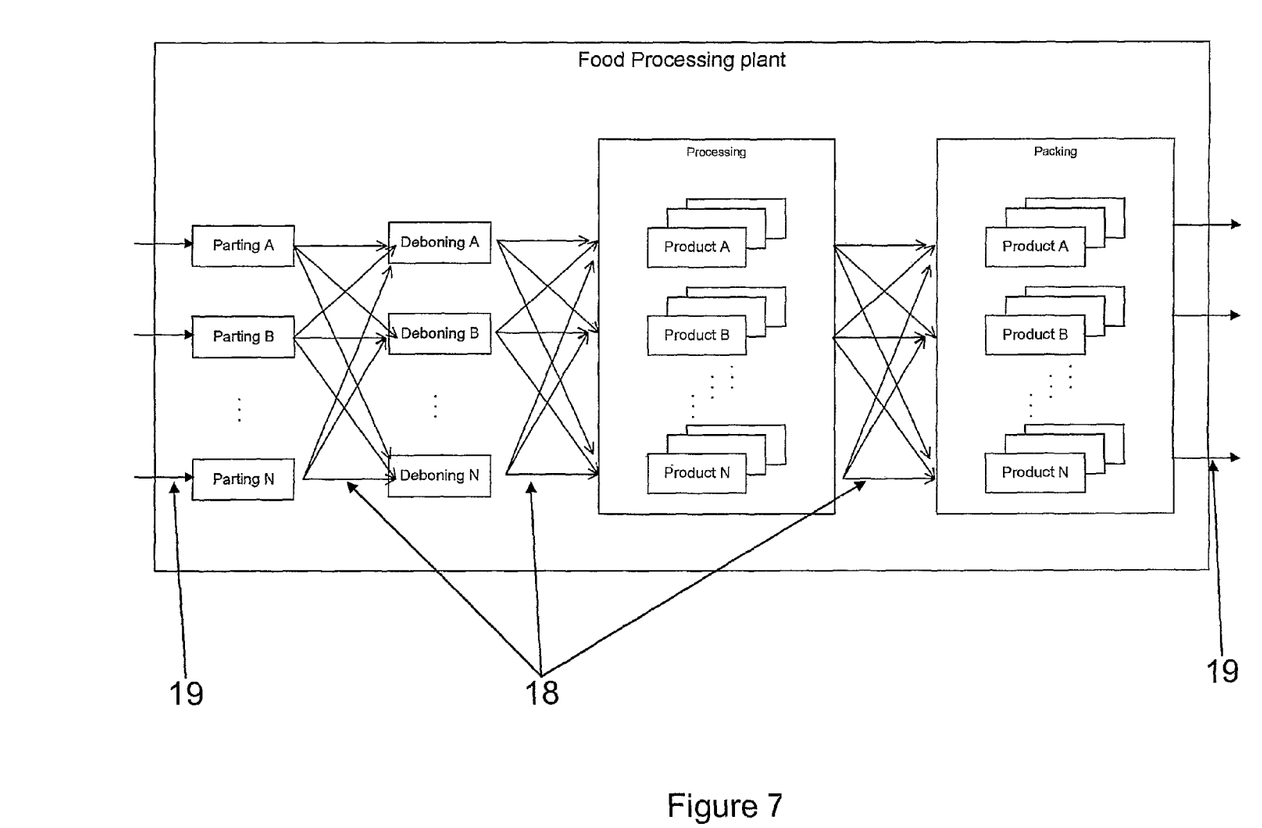
FIG. 7. The figure shows processing points were shuffling might take place.

As discussed above, in the processing of food items, there are certain points (18) in the process where a decision needs to be made which may cause shuffling of items to reach some desirable outcome. FIG. 6 shows one possible processing arrangement, highlighting processing points where shuffling (18) might take place. FIG. 7 also shows processing points where shuffling (18) might take place. Items arrive at in-feed locations (19) from a process line or packing station, where the position of each item on the in-feed line is known. The information relating to the items arriving on an in-feed line is obtained by a control mechanism, which is either a processing device for processing the item or an autonomous robot for transferring the item. Items from the in-feed line are selected based on information and on criteria for further processing and placed one by one to at least one non-synchronized processing or out-feed line (19). The placement or position of the item after processing or transfer is stored as traceable information for the transferred items in a data base and the information relating to the item on arrival and the information after processing or transfer then contributes to an historic information of said items. After packing the items, the item is labeled with traceable information relating all the items which are packed together. This allows for quick tracking of products such as contaminated food items from the same origin, when a consumer gets a food poisoning or drugs, if a prescription drug causes undesirable effects.

It should be readily understood by one skilled in the art that in-feed locations and drop-off locations can be implemented in a variety of different ways. For example, conveyors, in-feed tables with predetermined locations, shoots, and myriad of other in-feed means and drop-off means. Therefore, the spirit and scope of the present invention is intended to comprise any means of in-feed and drop-off implementations as would be obvious to one skilled in the art and the tracing system of the present invention collects and stores all these information.

The invention claimed is:

1. A method for tracing items through a non-sequential processing of said items in which handling instructions and processing stations used to process said items and the in-feed and out-feed lines used to transfer said items to and from in-feed locations, processing stations and out-feed locations are dynamically selected based on at least one real-time processing information including the output to be achieved from the non-sequential processing of said items, the characteristics of said items to be processed, and the state of the non-sequential processing of said items, the method comprising the steps of:
  receiving an item at an in-feed area,
  obtaining a first information related to said item upon its arrival at the in-feed area, and storing the first information in a computer system,
  dynamically selecting, based on said at least one real-time processing information, one or more handling instructions for processing said item, and
  dynamically selecting, based on said at least one real-time processing information, at least one processing station from a plurality of processing stations to process said item,
  dynamically selecting, based on said at least one real-time processing information, an out-feed line from a plurality out-feed lines for transferring said item from said in-feed area to said selected at least one processing station on said selected out-feed line, while tracing the transferred item's position during said transfer,
  obtaining a second information related to said item after its transfer from the in-feed area, and storing said second information in the computer system, said second information including the transferred item's position during said transfer,
  processing said transferred item into smaller objects,
  obtaining information related to processing of said item and each of the smaller objects,
  transferring said smaller objects to an out-feed area, while tracing the smaller objects' positions,
  wherein, at said out-feed area, each of said smaller objects is provided with at least one record, said record constituting traceable historic information about said smaller object's corresponding received item consisting of said first information, said processing information, and said second information,
  said first and second information comprising a size or a shape of the item or the smaller objects which is obtained with imaging means,
  the non-sequential transferring of said items and said smaller items being carried out by a handling means that performs a non-sequential transfer of said items.

2. The method according to claim 1, wherein the steps of claim 1 are repeated through a series of non-sequential processes.

3. The method according to claim 1, wherein said first information for each item is obtained from a data storage means.

4. The method according to claim 1, wherein the non-sequential processing of said items is comprised of a plurality of processes, and wherein an out-feed line of one process leads to an in-feed line of another process.

5. The method according to claim 1, wherein the out-feed line leads to a packing station.

6. The method according to claim 1, wherein the items are labeled after packing with a reference to the historic information in the storage means.

7. A non-transient computer program product directly loadable into the internal memory of a digital computer, comprising software code portions for performing the method according to claim 1, when said computer program product is run on a computer.

8. A non-transient computer program product for operating a computer to perform the method according to claim 1, said computer program product comprising:
  a computer readable medium;
  first program instruction means, recorded on said medium, for instructing a computer processor to interact with a user via human machine interface,
  second program instruction means, recorded on said medium, for instructing a computer processor to retrieve data regarding items received at least one in-feed location,
  third program instruction means, recorded on said medium, for instructing a computer processor to communicate a first information regarding placement of said items at the in-feed location to a control device,
  fourth program instruction means, recorded on said medium, for instructing a computer processor to communicate a second information regarding placement of said items after transfer from the in-feed location,
  fifth program instruction means, recorded on said medium, for instructing a computer processor to register transfer data in said data storage means,
  sixth program instruction means, recorded on said medium, for instructing a computer processor to control a processing step of said items,
  wherein said computer program product governs the transfer of said items by controlling through the means of a hardware/software interface which items are picked from said at least one in-feed location and where the items are placed on at least one out-feed location after transfer from the in-feed location, and wherein said first and second information is obtained with imaging means.

9. The method according to claim 1, wherein the first information further comprises the origin of the item, type or subtype of item, weight and/or the position at the in-feed area and wherein the second information further comprises the origin of the item, type or subtype of item, weight and/or the position on the out-feed line.

10. The method according to claim 1, wherein the handling means is a robot, an operator, a mechanical device or an electrical device.

11. The method according to claim 10, wherein the robot is directly supplied with placement information.

12. The method according to claim 10, wherein said robot determines autonomously which items and smaller items are selected and where said items and smaller items are placed.

13. The method according to claim 10, wherein said robot is instructed as to which items are to be selected and where said items should be placed.

14. A system for tracing items through a non-sequential process in which handling instructions and processing stations used to process said items and the in-feed and out-feed lines used to transfer said items to and from in-feed locations, processing stations and out-feed locations are dynamically selected based on the at least one real-time processing information including the output to be achieved from the non-sequential processing of said items, the characteristics of said items to be processed, and the state of the non-sequential processing of said items, the system comprising:

at least one in-feed location where items are received,
a human machine interface,
at least one processing means,
a control means that interacts with a transfer means to dynamically select, based on said at least one real-time processing information, one or more handling instructions for processing said received items and at least one processing station from a plurality of processing stations to process said item, and to perform non-sequential transfers of the items from the at least one in-feed location area to at least one out-feed location,
a data storage and retrieving means for storing a first information relating to the items arriving at the in-feed location, and a second information relating to the handling of the items after transfer from the in-feed location,
computing means that processes the first and second information,
storage means that stores the first information relating to the items at the in-feed location and the second information relating to the items during handling as historic information about said items,
means for selecting at least one processing station to process each of said items,
means for transferring each of said items between said at least one processing station, while tracing its individual position,
means for processing said item into a smaller objects,
means for transferring said smaller objects to an out-feed area, while tracing each of their positions, wherein, at the out-feed area, each of said smaller objects is provided with at least one record, said record constituting traceable historic information said smaller objects and their corresponding received items consisting of said first information, information relating to the processing of the items and smaller objects, and said second information, and wherein said first and second information comprises a size or a shape of the item or the smaller object, which is obtained with imaging means, and wherein non-sequential transferring of said items and said smaller objects is carried out by a handling means that performs a non-sequential transfer of said items.

15. The system according to claim 14, wherein the system traces items being non-sequentially processed and wherein the non-sequential processing of traced items is repeated through a series of non-synchronised processes.

16. The system according to claim 15, wherein the handling means is a robot, an operator, a mechanical device or an electrical device.

17. The system according to claim 16, wherein the robot is directly supplied with placement information.

18. The system according to claim 16, wherein the robot autonomously determines which items are selected and where the items are placed.

19. The system according to claim 14, wherein said transfer means for transferring food items from the at least one in-feed location to the at least one out-feed location is an autonomous robot.

20. The system according to claim 14, wherein the items are labeled after packing with a reference to the historic information in the storage means.

21. The system according to claim 14, additionally comprising:
a label generating means, for generating a label referencing a record in said data storage means;
a label attaching device, for attaching said generated label to the finished and packed product;
wherein said label generating device and said label attaching device can be two separate devices or one and the same device.

22. The system according to claim 14, wherein the first information further comprises the origin of the item, type or subtype of item, weight and/or the position at the in-feed area and wherein the second information further comprises the origin of the item, type or subtype of item, weight and/or the position on the out-feed line.

* * * * *